S. G. SWAIN.
Glass-Molds.
No. 148,859.  Patented March 24, 1874.
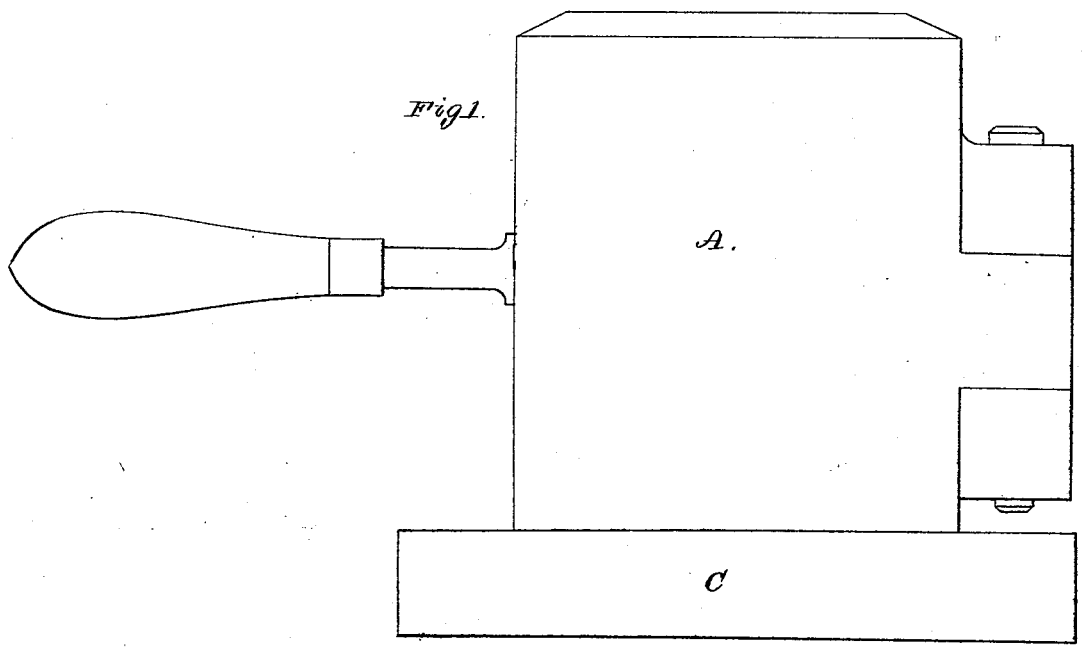
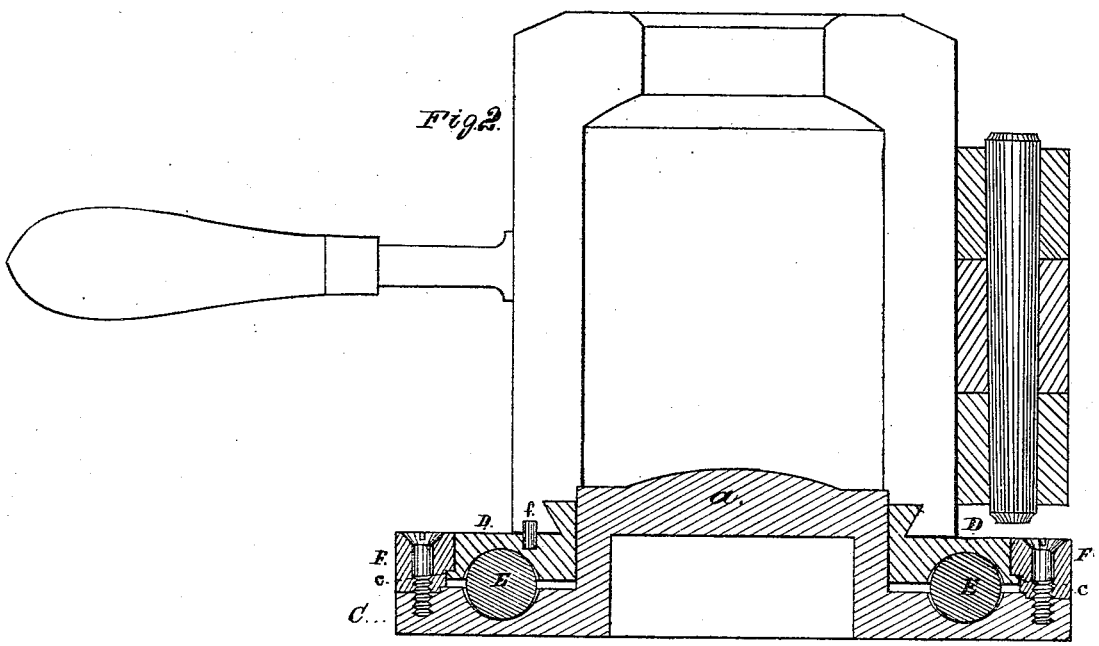
Witnesses
Geo. Gray
F. C. Hale
Samuel G. Swain
by his attorney
F. P. Hale

UNITED STATES PATENT OFFICE.

SAMUEL G. SWAIN, OF BOSTON, MASSACHUSETTS.

IMPROVEMENT IN GLASS-MOLDS.

Specification forming part of Letters Patent No. 148,859, dated March 24, 1874; application filed March 2, 1874.

*To all whom it may concern:*

Be it known that I, SAMUEL G. SWAIN, of Boston, in the county of Suffolk and State of Massachusetts, have invented a new and useful Improvement in Glass-Blowers' Molds; and do hereby declare the same to be fully described in the following specification and represented in the accompanying drawing, in which—

Figure 1 denotes a side elevation of a mold constructed in accordance with my invention; Fig. 2, a central and vertical section, showing one-half of the matrix in elevation.

It is a fact well known that in forming blown-glass articles in stationary molds a seam or ridge is produced in the article formed at each joint in the mold, such not only marring the appearance of the article and lessening its marketable value, but also impairing its light-transmitting property when such article is used for the transmission or diffusion of light.

The object of my invention is to provide a simple and effective means or apparatus whereby a perfectly smooth and seamless surface may be imparted to the article while being blown and molded; and my invention consists in the novel construction and arrangement of the parts of the mold, as hereinafter described and claimed, whereby slight vibratory reciprocating movements may be imparted to the matrix while the article is being formed, and thereby the formation of seams or ridges avoided.

In the drawing, A A denote the two halves of the matrix or body of the mold, the same being provided with handles and hinged together in the ordinary manner. C denotes the base of the mold, which may be of a circular or other desirable shape in horizontal section. The said base has a circular raised table, $a$, formed axially thereon, as shown in Fig. 2. Disposed around this table, and concentric therewith, is an annular plate, D, having an annular semicircular groove formed in its lower surface, such groove being opposite to, and corresponding with a similar groove formed in the upper face of the base A, as shown in Fig. 2, the said grooves being to receive a series of spherical balls, E. The plate D is maintained in impingement upon the balls by means of an annular plate, F, having a shoulder, $c$, which rests upon an annular lip or flange formed upon the outer face of the plate D, as shown in Fig. 2, the plate F being securely fastened to the base A by means of screws. Furthermore, the plate D has an angular or dovetailed flange formed around its top surface to fit into a correspondingly-shaped groove formed in the lower end of the matrix. The plate D is connected with the matrix or body of the mold by means of pins $f$, so that both parts may be moved in unison.

From the above it will be seen that, by my construction, the plate D rests on the top of the balls, and is maintained in connection therewith by the plate F, the plate D being capable of being moved or vibrated upon the balls and upon the table $a$ as a center.

In using my improved mold, the glass-blower, having gathered the requisite quantity of molten glass upon the end of his pipe, and manipulated and formed it into a hollow pear shape in the usual manner, deposits it upon the central part of the table, or a bottom former disposed thereon. The two halves of the matrix are next closed. The glass-blower next commences to blow and inflate the glass. His attendant in the meantime, having seized the handles, gives to the matrix a slight vibratory movement back and forth, a movement of one-fourth of an inch being all that is requisite to give a perfectly smooth and seamless surface.

I am aware that the outer surfaces of glass articles have been formed by means of mechanism, causing the mold to be rapidly rotated around the surface of the glass. I am also aware of the objection incident to such, for should there be the slightest defect in the mold such would produce an imperfection around the entire outer surface of the glass.

I do not claim a rotary mold, as my invention requires no rotation, but only such capacity as will enable it to be moved through an arcal distance of one-fourth of an inch.

What, therefore, I claim as my invention is—

The improved glass-blower's mold, as described, the same consisting of a base, $a$, the movable plate D, clamp-plate F, the series of balls E, combined with the matrix and its handles in manner as and for the purpose set forth.

SAMUEL G. SWAIN.

Witnesses:
F. P. HALE,
F. C. HALE.